(12) United States Patent
Sloan et al.

(10) Patent No.: US 8,926,436 B2
(45) Date of Patent: Jan. 6, 2015

(54) METHOD AND DEVICE FOR FANTASY SPORTS ROSTER RECOMMENDATIONS

(75) Inventors: J. Nathaniel Sloan, Bellevue, WA (US);
Michael A. Polikoff, Bristol, CT (US);
James Ryan Kelley, Seattle, WA (US);
Robert Paul Smith, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/531,089

(22) Filed: Jun. 22, 2012

(65) Prior Publication Data
US 2013/0344964 A1 Dec. 26, 2013

(51) Int. Cl.
*A63F 13/12* (2006.01)

(52) U.S. Cl.
USPC .............................................. 463/42; 463/43

(58) Field of Classification Search
CPC .......... A63F 13/10; A63F 13/12; G07F 17/32
See application file for complete search history.

(56) References Cited

U.S. PATENT DOCUMENTS

| | | | |
|---|---|---|---|
| 2007/0021165 A1* | 1/2007 | Ma et al. | 463/1 |
| 2011/0319171 A1* | 12/2011 | Ngozika | 463/42 |
| 2012/0202599 A1* | 8/2012 | Cohen | 463/42 |

OTHER PUBLICATIONS

"Ask the Commish" by Bill Davies and Bill Desimone (http://apps.footballguys.com/04davies_kissing.cfm).*

* cited by examiner

*Primary Examiner* — Tramar Harper
(74) *Attorney, Agent, or Firm* — Fay Kaplun & Marcin, LLP

(57) ABSTRACT

A method and device generates probability-based recommendations for a fantasy sports game. The method includes receiving first and second rosters for a first and second user, respectively; receiving parameter values for each sport player on the rosters; determining a score value for the sport players based on the parameter values; determining first and second lineups for the first and second users, respectively, the first lineup having a first projected probability distribution and the second lineup having a second projected probability distribution, the first and second projected probability distributions determined as a function of the score values; and determining a win probability value based on the first and second projected probability distributions, the win probability value indicative of a prediction of a comparison between a first actual total score value and a second actual total score value.

20 Claims, 7 Drawing Sheets

US 8,926,436 B2

METHOD AND DEVICE FOR FANTASY SPORTS ROSTER RECOMMENDATIONS

INCORPORATION BY REFERENCE

The entire disclosures of U.S. patent application Ser. No. 13/331,894, filed Dec. 20, 2011, U.S. patent application Ser. No. 12/760,277, filed Apr. 14, 2010, U.S. patent application Ser. No. 12/760,422, filed Apr. 14, 2010, U.S. patent application Ser. No. 12/760,384, filed Apr. 14, 2010, and U.S. patent application Ser. No. 12/760,269, filed Apr. 14, 2010, including the specification, claims, and abstract, all of which share at least one common inventor and are assigned to a common assignee with the present application, are hereby expressly incorporated by reference herein.

FIELD OF THE INVENTION

The invention pertains to the field of fantasy sports games. The exemplary embodiments relate to a method and system for providing recommendations for a head to head fantasy match-up; in particular, recommendations for changes to a roster as a function of the roster of the opponent team.

BACKGROUND INFORMATION

A fantasy sports game is a game where users act as managers or owners of simulated sport teams called "fantasy teams," where each team comprises a number of "players," often known as a "roster." Thus, the term "owner" is used to refer to a participant in the fantasy sports game. An owner may be a natural person or a computer-controlled opponent. A "user" is a fantasy owner who is also a natural person. Thus, the term "user" and "owner" are used interchangeably. In contrast, the term "player" refers to one of the selectable fantasy characters. In certain fantasy sports games, each player corresponds to an athlete in a professional sport league.

In these fantasy sports games, users are organized into groups, called "leagues," for the purposes of competition. It is customary for each league to have rules that relate to the fantasy sports game; for example, they may set limits upon the number of players allowed on any team, and they may determine the system by which a score is computed and victory is determined.

In conventional fantasy sports games, users may divide their roster into two sets, "active" players and "benched" players (collectively, "the bench"). It is customary for the rules of the league to specify the number of players who may be active at one time. Furthermore, benched players are customarily excluded from the calculation when computing the score of a match-up.

In some conventional games, the collective statistical values of the bench may be used to break a tie.

It is further customary for the league rules to define a plurality of "active roster slots," or "slots," wherein each slot may be limited as to which fantasy players may occupy the slot; often, these limits are based upon the position they play in the actual sport. For example, in a fantasy sports game based upon American football, a "quarterback slot" may be filled only by a player whose position is quarterback.

In this way, the "active roster" can be defined as the group of players on a fantasy team, each of whom occupies an active roster slot, accordingly to the rules of the fantasy team. A "lineup" consists of a proposed active roster and the remaining benched players, such that a lineup can be seen as a specific manner to arrange the players on the team and to determine who is to be active.

As is common in the art, the terms "lineup," "roster," and "team" may be used interchangeably in this document, with the precise meaning evident from content, or specified for clarity, as necessary.

Conventional recommendation engines are known in the art. One conventional engine recommends which players should constitute the active roster; these may be known as "start/sit recommendations." They tend to be based upon a specific expectation of the points to be scored and are made without reference to the other team in the matchup. That is, they focus on attempting to score the most possible points without any concern about what the other team will do or how likely victory may be.

Furthermore, conventional recommendation methods often focus on the team of the owner as a whole and generate the recommendation as a function of a highest potential score given the roster of the owner. Accordingly, the conventional recommendation methods generate the recommendation independent of the opponent. However, by focusing only on the roster of the owner, there is a likelihood that the recommended team may lose due to factors such as variance in expected statistics of the players who are placed on the team.

DETAILED DESCRIPTION

Figure 1:
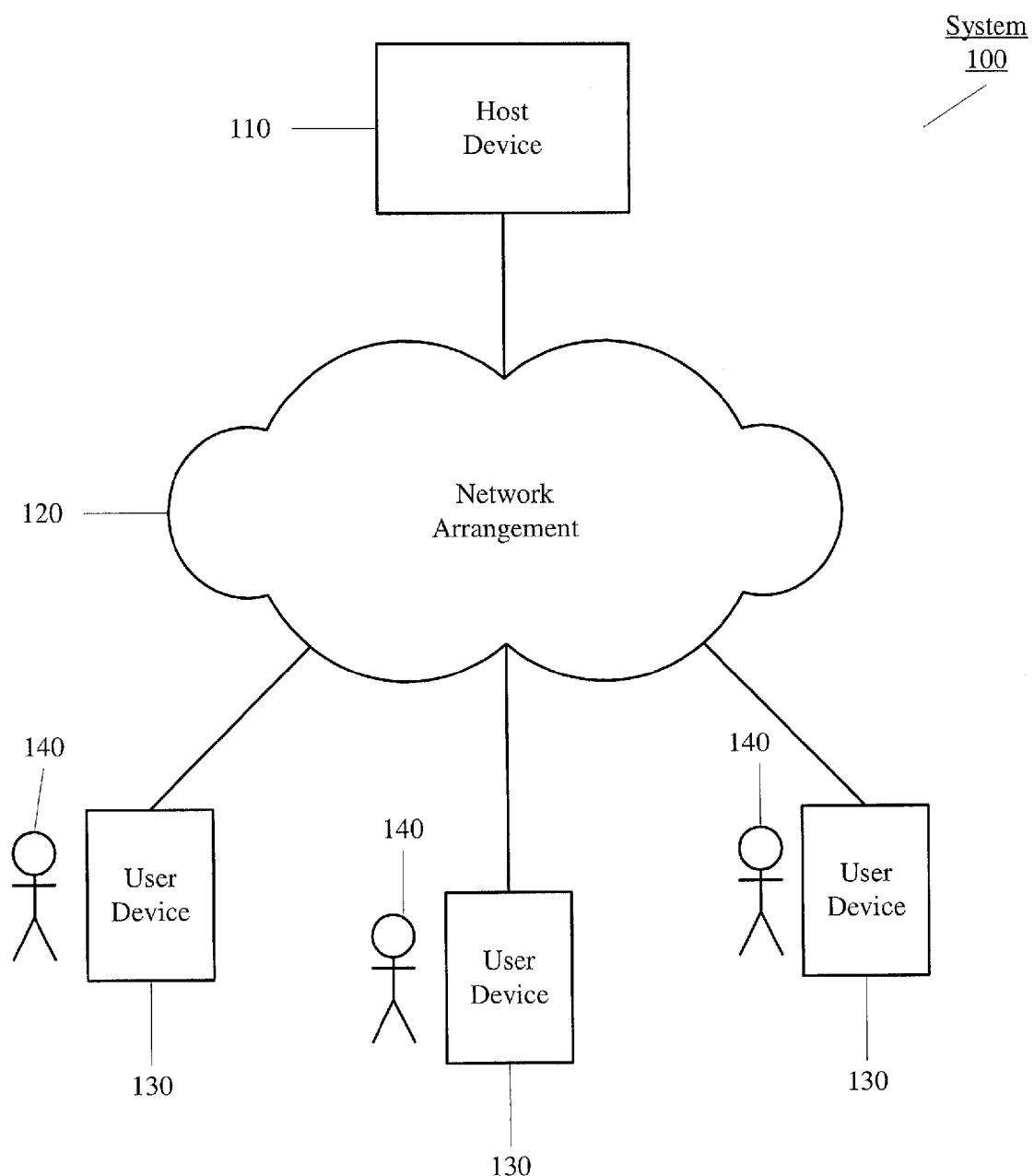
FIG. 1 shows a system in which a fantasy sports application is executed according to an exemplary embodiment of the present invention.

The present invention relates to a method and device for a fantasy sports application comprising receiving a first roster including at least one first sport player for a first user and a second roster including at least one second sport player for a second user; receiving at least one parameter value for each of the first and second sport players; determining a score value for each of the first and second sport players as a function of the at least one parameter value; determining at least one first lineup for the first user as a subset of the first roster and at least one second lineup for the second user as a subset of the second roster, the first lineup having a first projected probability distribution range and the second lineup having a second projected probability distribution range, the first and second projected probability distribution range determined as a function of the score values; and determining a probability value as a function of the first and second projected probability distribution ranges, the probability value being indicative of the first user having a first actual total score value greater than the second user having a second actual total score value, the first and second actual total score values related to the first and second lineups, respectively, after a match-up between the first and second users.

The exemplary embodiments may be further understood with reference to the following description of the exemplary embodiments and the related appended drawings, wherein like elements are provided with the same reference numerals. The exemplary embodiments are related to systems and methods for providing probability calculations of victory over an opponent team. Specifically, the owners may select a provisional lineup, and a calculation of that lineup's probability of winning the owner's match-up may be determined. Furthermore, a recommendation may be provided in which a specific lineup is recommended as having the highest probability of victory against the owner's current opponents. While competing against an opponent team, a fantasy team owner must consider a multitude of factors to determine whether victory is achievable. The exemplary embodiments of the present invention assist in the selection of the team by providing probability calculations or recommendations that help guide the decision-making process, in a manner useful during a head-to-head match-up.

Initially, it is noted that the terminology used herein for the exemplary embodiments of the present invention are consistent with what was described above. Accordingly, the terms of an "owner" and a "user" may be used interchangeably to refer to a common person who owns a fantasy team. On the other hand, the term of "a player" relates to an actual sport athlete participating in the respective sport of the fantasy sports application.

Furthermore, it is noted that the exemplary embodiments of the present invention relate to a league wherein head-to-head match-up play has started or is imminent. That is, each owner participating in the league has already drafted a roster of players available to form a team to play against an opponent owner also having a roster of players. The drafting of the players may be performed using any conventional method such as a serpentine method or auction method. In addition, the exemplary embodiments of the present invention relate to a situation when the owner is set to play against a single opponent owner having a known roster of players.

It should further be noted that the head-to-head match-up may relate to an overall score of a first owner being compared with an overall score of a second owner to determine the winner. However, the head-to-head match-up may also relate to a category-based game. In one exemplary category-based game, each category of performance contributes separately to the score used to determine the winner in the head-to-head match-up. For example, in a game where there are 10 categories, an owner could win 7-3 by outscoring an opponent in 7 of the 10 categories, and thereby get 7 points in the overall standings. In another exemplary category-based game, the same 7-3 win may be counted as a single game, and hence a single point in the standings. The exemplary embodiments of the present invention may be applied to any type of head-to-head match-up.

According to the exemplary embodiments of the present invention, a recommendation engine may provide a calculation value indicative of a victory probability over the opponent owner's team. As will be described in further detail below, the probability may be generated as a function of the available players on the roster of the owner in a head-to-head match-up in view of a team potentially set by the opponent owner from the roster thereof. Accordingly, the recommendation engine may provide a recommendation regarding the team to be set by the owner from the roster thereof having the highest probability of victory over the opponent owner. The recommendation engine may further provide a substitution in the roster of players of the owner from available players not currently assigned to any roster that may further increase the probability for victory in the head-to-head match-up. The probability values and the recommendations may be derived from a variety of sources and tailored for a specific set of rules in use in the league. The rules may be input by the user of the system of the present invention or may be input by a user (i.e., a fantasy team owner) in an exemplary embodiment where the user is participating in a game that is not run by the system owner. In the exemplary embodiments where the rules are integrated into the system that is administering the fantasy league, the recommendations may be available to be accessed at any time without having to use an external source.

The fantasy sports application may be an interface provided on a client, for example, executed at a remote location. Accordingly, the client may be executed on an electronic device that is configured with a transceiver to connect the device to a network. FIG. 1 shows a system 100 in which the fantasy sports application may be executed. As shown in FIG. 1, a plurality of users 140 may each have a user device 130 that is configured to communicate with a communication network 120, for example, via a wired or wireless connection. The network 120 may include or connect to a host device 110 that is configured to execute the fantasy sports application. As will be described in further detail below, the fantasy sports application may be configured to provide the probability values and recommendations to the users 140. Accordingly, the host 110 may be connected or have access to a plurality of different sources of data that is used to provide the recommendations. It should be noted that the use of three users 140 and respective user devices 130 is only exemplary. Those skilled in the art will understand that the system 100 may include any number of users 140 and user devices 130 who participate in the fantasy sports application.

The network 120 may be any type of network configuration capable of connecting the plurality of user devices 130. In a first exemplary embodiment of the present invention, the host 110 may be a website. Accordingly, the network 120 may be the Internet (e.g., WAN). In this exemplary embodiment, the network 120 may include a plurality of network components such as a server, a database, a network management arrangement, a plurality of access points, etc. In a second exemplary embodiment of the present invention, the host 110 may be an electronic device (e.g., server terminal) operated by a user. Accordingly, the network 120 may be a local area network (LAN). In this exemplary embodiment, the network 120 may include a hub that is configured to connect the user devices 130 to the host 110 for data to be exchanged thereamong.

Figure 2:
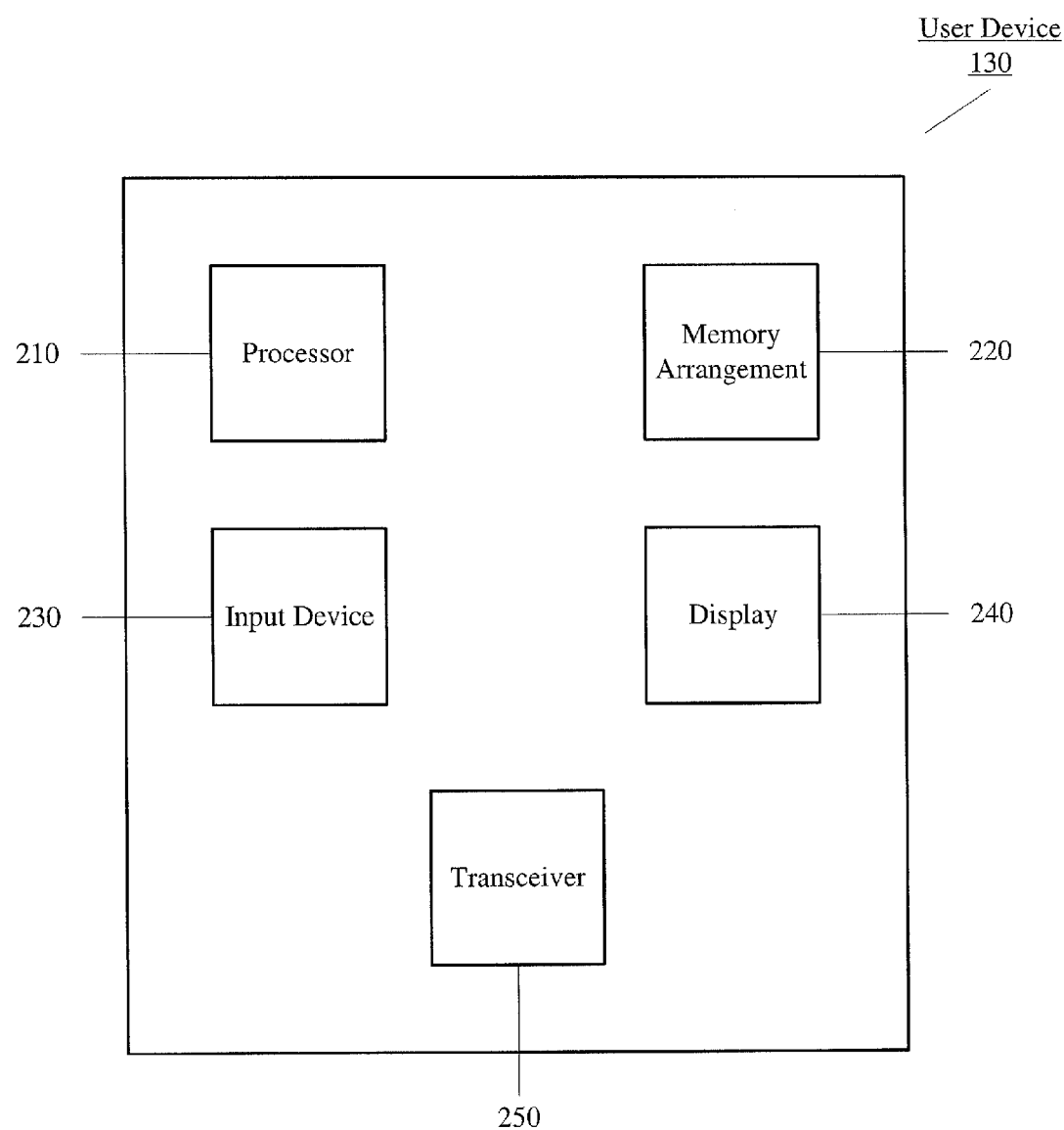
FIG. 2 shows a user device that connects to a host of FIG. 1 for the fantasy sports application according to an exemplary embodiment of the present invention.

FIG. 2 shows one of the user devices 130 that connects to the host 110 and shows the interface for the fantasy sports application according to an exemplary embodiment of the present invention. The user device 130 may be an electronic device, such as a computer terminal, a laptop, a personal digital assistant, a tablet, a cellular phone, etc. The user device 130 may also operate using any operating system such as Windows, Mac OS, Linux, Android, iOS, etc. That is, the recommendation engine according to the exemplary embodiments of the present invention may be adapted for any platform used by the user device 130. It should also be noted that the recommendation engine according to the exemplary embodiments of the present invention may also be adapted to any fantasy sports game that is run on the host 110. The user device 130 may include a processor 210, a memory arrangement 220, an input device 230, a display 240, and a transceiver 250. It should be noted that the user device 130 may include further components; for example, when the user device is a portable electronic device, a power supply may be included. It should also be noted that the input device 230 and the display 240 may be embodied together, for example, in a touch screen configured to perform both functionalities.

The processor 210, the memory 220, the input device 230, the display 240, and the transceiver 250 may all provide conventional functionalities for the user device 130. For example, the processor 210 may execute the interface for the fantasy sports application. In another example, the processor 210 may execute a browser application, which then provides a user interface wherein the fantasy sports application is displayed and through which user actions are communicated. The transceiver 250 may exchange data through the network 120 with the host 110, in particular to receive data related to the fantasy sports application as well as the recommendations generated by the recommendation engine, as will be discussed in further detail below.

When a user 140 elects to set a lineup for a head-to-head match-up, the host 110 may include a recommendation engine that utilizes one or more probability values and generates recommendations for the user to determine an optimal lineup, having the highest probability for victory over the opponent in the head-to-head match-up. Specifically, using projected data, such as score values (which eventually generate a total projected score value) and variability data, the probability may indicate the chances that the actual score values (which eventually generate a total actual score value) for the team will be greater than those of the opponent. The actual score values may relate to the scores provided by the players after a game, a week of games, etc., as according to the rules for the league.

Figure 3:
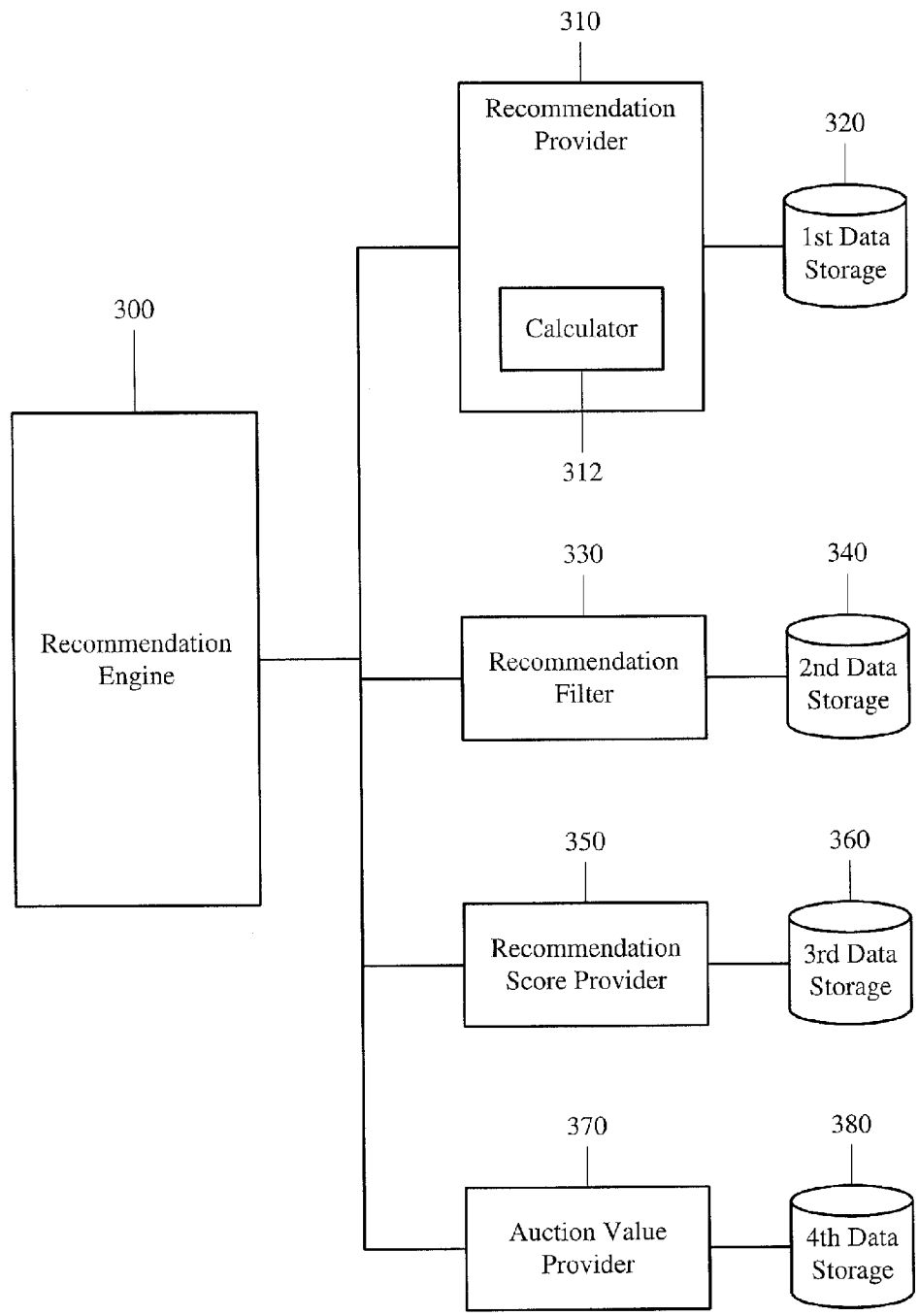
FIG. 3 shows a recommendation engine according to an exemplary embodiment of the present invention.

FIG. 3 shows a recommendation engine 300 that is configured to utilize the calculation values such as the probability value and generate the recommendations according to an exemplary embodiment of the present invention. The recommendation engine 300 may be incorporated as part of the host 110 or may be a separate utility of the fantasy sports application. The recommendation engine 300 may also be configured to access or be connected to a plurality of data sources. For example, the data may be related to past ranking values of a player as a function of performance from previous seasons. In another example, the data may be related to current ranking values of a player as assessed by other leagues in the sport of the fantasy sports application. In yet another example, the data may be related to ranking values as determined by "experts" in the sport. In a further example, the data may be related to the probability values calculated from a source configured to generate these values. It should be noted that there are many other sources of data that provide ranking values of players that the recommendation engine may consider prior to generating the recommendations to the users 140.

For the recommendation engine 300 to ultimately generate the recommendations from the probability values, the recommendation engine 300 may utilize a plurality of processors that provide data thereto. As illustrated in FIG. 3, a plurality of processors may include a recommendation provider 310 connected to a first data storage 320, a recommendation filter 330 connected to a second data storage 340, a recommendation score provider 350 connected to a third data storage 360, and an auction value provider 370 connected to a fourth data storage 380. According to the exemplary embodiments of the present invention, the recommendation provider 310 may be configured to generate the probability values. Specifically, the recommendation provider 310 may include a calculator 312 that uses the data from the first data storage 320 to generate probability values. Because the recommendation engine 300 is designed with multiple componentized interfaces, additional ranking techniques and weights to the system may be added easily by, e.g., the owner. If required, further processors may also be incorporated for the recommendation engine 300. By receiving the data from the plurality of processors listed above, the recommendation engine 300 may analyze the data including the probability values and generate the recommendations according to the exemplary embodiments of the present invention.

According to the exemplary embodiments of the present invention, the recommendation engine 300 may initially receive the roster of players for the owner and the opponent owner. In addition to these lists of players, the recommendation engine 300 may further receive data (e.g., projected statistical values) regarding the sport players under consideration, including those on the rosters of the owner and the opponent owner. As discussed above, the recommendation engine 300 may receive this data from a plurality of data sources; for clarity, these are coalesced in the drawings as data storage 320. Those skilled in the art will recognize that multiple data storages may be used without altering the invention. The data regarding the players may include a variety of different statistical values, such as previously attained statistics, current statistics, or projected future statistics. These projections may include data relating to the variability of the projections as opposed to the expected actual values; for example, in a fantasy sports game based upon American football, a player may be projected to achieve 130+/−40 yards rushing in an upcoming game. The recommendation engine 300 may consider any combination of these statistics to provide the probability values and recommended team for the owner.

Upon receiving the rosters of both the owner and the opponent owner with the data related to each player on both rosters, the recommendation engine 300 may determine the various lineups possible for a team for both the owner and the opponent owner. For example, when the fantasy sports application relates to football, there may be slots for a particular position on offense (e.g., running back) and a slot for a defense; therefore, the possible lineups are limited to those that comply with these rules. It should be noted that in this context, a defense may refer to a player analogue in the fantasy sports game, wherein the statistical accomplishments of an entire professional team's defense are aggregated together and treated as a unit, as is customary in the art. Using the data available thereto, the recommendation engine 300 may begin to start calculating probabilities for potential match-ups between the possible lineups of the owner and the opponent owner. Initially, the recommendation engine 300 may determine projected score values associated with each of the players from the parameter values received from the processors. According to an exemplary embodiment of the present invention, the recommendation engine 300 may initially determine an optimal lineup for the opponent owner from the available opponent roster that has the greatest potential to defeat the owner. Using this projected opponent lineup as a basis, the recommendation engine 300 may then determine the various possible lineups of the owner and how such lineups would compare in a head-to-head match up by calculating the probability of victory against this "optimal" lineup of the opponent owner. According to another exemplary embodiment of the present invention, the recommendation engine 300 may receive a lineup of the opponent owner. For example, the recommendation engine 300 may use a lineup used by the opponent owner from a prior head-to-head match up, a lineup that has already been set by the opponent owner, etc. Another exemplary embodiment of the present invention selects the players who are collectively projected to score the most points, regardless of that lineup's probability to defeat the lineup of the owner.

Once an opponent owner's lineup is determined, the recommendation engine 300 determines a recommended lineup for the owner. Once the recommendation engine 300 has determined the lineup for the owner having the highest probability of victory over the optimal lineup of the opponent, the recommendation engine 300 may display this result to the owner by showing the probability (e.g., received from the recommendation provider 310 via the calculator 312) or the recommended lineup for the owner. The recommendation engine 300 may also show the lineup of the opponent, either as currently constituted or with the proposed optimal changes.

It should be noted that the fantasy sports application may also be configured in a conventional manner so that the owner is allowed to form a lineup manually. Thus, upon manually creating a lineup, the calculator 312 of the recommendation provider 310 may apply the probability calculations for this lineup and compare it to the "optimal" lineup of the opponent owner to generate a probability value and forward this value to the recommendation engine 300. Alternatively, the recommendation provider 310 may use the opponent lineup as currently constituted as the basis for generating the probability. The recommendation provider 310 may also generate the probability against the opponent lineup collectively projected to score the most points.

When the owner receives the probability and the optimal lineup associated therewith or the probability for a manually selected lineup, the owner may further provide manual changes to the lineup. If this occurs, the calculator 312 of the recommendation provider 310 may recalculate the probability using the updated lineup as a basis to generate a new probability value that reflects how the updated lineup will fare against the opponent team. Accordingly, the new probability value may be displayed with the new lineup. The owner may repeatedly provide substitutions and have the calculator 312 of the recommendation provider 310 recalculate the probability each time.

The recommendation provider 310 may further be configured to determine if the probability of victory in the head-to-head match-up may be increased. Specifically, the recommendation provider 310 may review available players who are not assigned to any team in the league. Accordingly, the recommendation provider 310 may list possible substitutions of unassigned players whom the owner may potentially add to the roster and place in the lineup as a means to further increase the chance of victory over the opponent owner. Accordingly, the recommendation engine 300 may receive the recommendations from the recommendation provider 310 regarding substitutions that will increase the probability of victory over an opponent lineup. The method of increasing the probability will be discussed in further detail below.

It should be noted that this feature for providing substitution players from an available pool of players may be implemented in a variety of ways. In a first example, the recommendation engine 300 and the recommendation provider 310 may provide a list of potential lineup substitutions for the owner to accept. In a second example, the recommendation engine 300 may include a further interface that allows the owner to launch this feature after selecting a preliminary owner lineup from only the available players on the owner roster. In this case, the preliminary lineup would be used as a starting point, and players assigned to the bench in the preliminary lineup would not be considered for inclusion in the recommended lineup. The recommended lineup would consist of one player selected from the available players and the players selected for the preliminary lineup, without including a player being replaced.

The recommendation engine 300 is further configured to determine a range of possible values or scores associated with the players instead of an exact prediction value. Therefore, the recommendation engine 300 may receive the player data from the processors and data storages to determine the range of scores that the player is projected to provide to the owner. Accordingly, this range data may be used by the calculator 312 to determine the probability of winning a head-to-head match-up. Through consideration of a range of values rather than a single exact value, the calculator 312 is able to determine a probability value for the chances of the owner being able to beat the opponent owner. Therefore, the above description relating to the generation of a lineup and the generation of the probability value considers this range of data that produces a projected probability distribution range.

The recommendation engine 300 may be additionally be configured to provide different formats of presenting the recommendations and substitutions (e.g., on a graphical user interface). As described above, the various lineups may be shown to the users. That is, the entire list of players for the first and second lineups may be included in the display to the users. According to another exemplary embodiment of the present invention, upon determining the recommendations for the lineup or the substitutions to increase the probability of winning, the recommendation engine 300 may show the recommended changes or the recommended substitutions to the owner's lineup. Thus, in the example where the user manually sets the lineup described above and calculates the probability of winning, the recommendation engine 300 may display a recommendation that player X selected on the current lineup should be switched with player A currently on the bench. Accordingly, the recommendation engine 300 may also display a recommendation that player Y selected on the current lineup should be substituted with player B who is currently not assigned to any team.

It should be noted that the use of a single lineup being recommended to the owner is only exemplary. According to another exemplary embodiment of the present invention, the recommendation provider 310 may determine multiple lineups for both the first owner and the second owner of the head-to-head match-up. Thus, a respective lineup may be determined and shown to the owner as a function of the lineup of the opponent. For example, the recommendation provider 310 may determine that if the opponent selects a first opponent lineup, the owner is recommended to use a first owner lineup; if the opponent selects a second opponent lineup, the owner is recommended to use a second owner lineup; etc. The further features of the recommendation engine 300 and the recommendation provider 310 may be incorporated in this functionality. For example, if the owner lineups being recommended relate to only players in the owner's roster, substitutions may also be provided from unassigned players to the various owner lineups being recommended for each opponent lineup.

Figure 4:
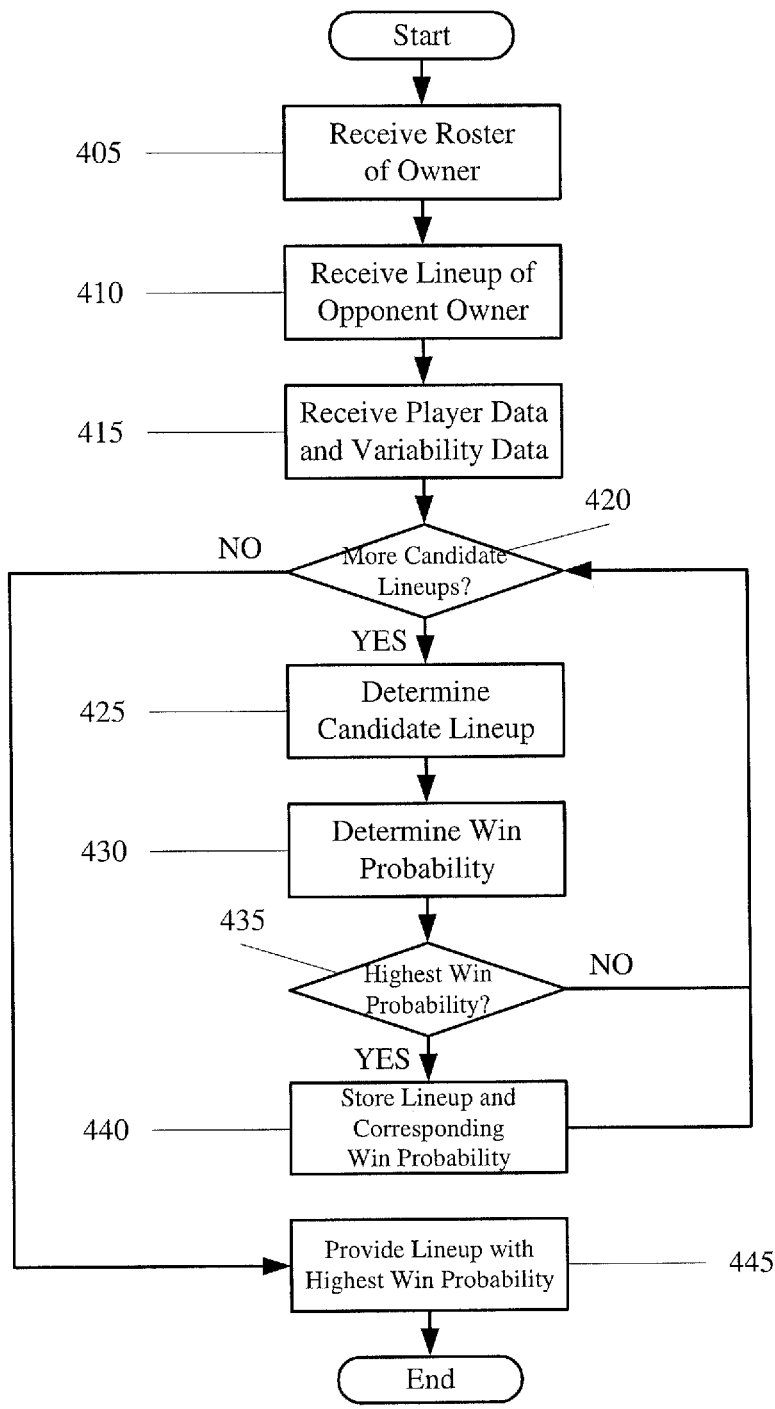
FIG. 4 shows a method for generating a lineup with a highest win probability according to an exemplary embodiment of the present invention.

FIG. 4 shows a method 400 for generating a lineup with a highest win probability according to an exemplary embodiment of the present invention. The method 400 will be described with reference to the recommendation engine 300 and the recommendation provider 310 of FIG. 3. The method 400 relates to determining a lineup for the owner to have a highest probability of victory over a lineup of an opponent in a head-to-head match-up.

In step 405, the recommendation provider 310 may receive the roster of the owner. As discussed above, the roster may include a list of players who are currently assigned to the team of the owner. In step 410, the recommendation provider 310 may receive the lineup of the opponent owner. The lineup of the opponent owner may have already been selected and set for the upcoming head-to-head match-up with the owner. The lineup of the opponent owner may also be selected from a previously used lineup in a prior head-to-head match-up, or may be determined/predicted by a recommendation engine, as described above. Furthermore, multiple opponent lineups may be used. In step 415, the recommendation provider 310 may receive player data (e.g., projected statistical data) as well as variability data related to the players for both the roster of the owner and the roster of the opponent owner. As discussed above, the player data and the variability data may be received from a plurality of sources.

In step 420, the recommendation provider 310 determines if there are any candidate lineups to be generated from the roster of the owner. During a first run of the method 400, there will be no candidate lineups that were generated. Accordingly, there will be more candidate lineups to be determined. Thus, in step 425, the recommendation provider 310 determines the candidate lineup.

In step 430, the calculator 312 of the recommendation provider 310 determines a win probability of the candidate lineup determined in step 425 with the lineup of the opponent owner received in step 410. The win probability may be calculated as a function of known probability theory.

In an alternate embodiment for category-based leagues that count each category separately for the purposes of computing the standings, for each candidate lineup, step 430 may include: (a) calculating the probability of winning each statistic individually (as compared to the projection for the opponent); and (b) calculating the total projected number of category wins (points) by adding the expectation of each statistic together. For category-based leagues where the categories are jointly considered and the result of the match-up is either a single win or a single loss, then for each candidate lineup, step 430: (a) calculates the probability of winning each statistic individually (as compared to the projection for the opponent); (b) calculates the total projected number of category wins (points) by adding the expectation of each statistic together; and (c) calculates the distribution of projected category wins (e.g., by simulation).

In step 435, the recommendation provider 310 determines if the win probability is the highest determined thus far. Again, during a first run of the method 400, there will be no win probabilities previously determined to use for reference. Thus, in step 440, the candidate lineup and corresponding win probability are stored as the highest encountered so far. The recommendation provider 310 may be configured with a memory arrangement or connected to a memory arrangement for the storing of the candidate lineup and corresponding win probability. In embodiments applied to category-based games, the highest win probability is calculated as the lineup that has the highest projected number of category wins.

After step 440, the method 400 returns to step 420 to determine if there are any remaining candidate lineups to be determined. When further candidate lineups are still yet to be determined, the method 400 repeats steps 425-440. Thus, in a second run of the steps 425-440, a further candidate lineup is determined in step 425 and a further win probability is determined in step 430. The win probability and the further win probability are compared in step 435 so that the candidate lineup having the higher win probability value determines the candidate lineup that is stored in step 440. In this manner, steps 420-440 of method 400 are able to determine the lineup from the roster of the owner having the highest probability of victory over the opponent in a head-to-head match-up with the given lineup received in step 410.

When the highest candidate lineup is found and no further candidate lineups are available, the method 400 continues from step 420 to step 445. In step 445, the recommendation provider 310 provides the candidate lineup and the corresponding win probability (which is the highest generated) to the owner.

It is noted that not all possible candidate lineups need be tested. Many lineups may be known, a priori, to be equivalent, or may be known to be superior. As an example, if a player does not have a game scheduled during a given competition period, his stats are known (zero for every statistical category); all such players are equivalent, so some lineups may not need to be considered. As a further example, it may be possible to determine that one set of lineups offers no advantage over another—if there is a first player who is projected always to score more points than a second player, regardless of situation, there is no need to test a lineup featuring the second player where the first player is assigned to the bench.

Furthermore, lineups that are not valid according to the rules of the game may not be considered. For example, if the league rules allow for a single quarterback to be active, lineups considering more than one quarterback need not be considered and may not be returned.

Figure 5:
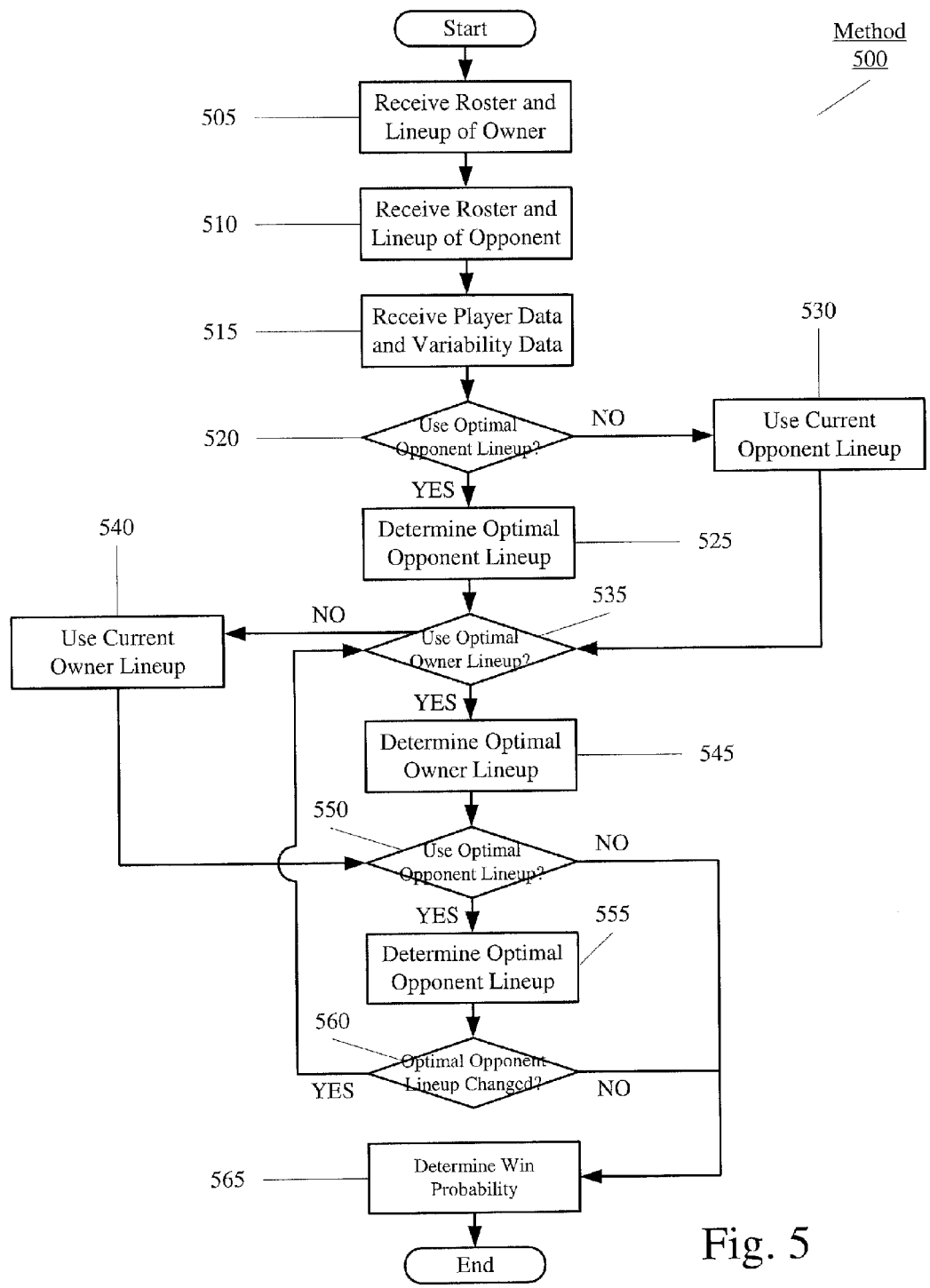
FIG. 5 shows a method for determining a win probability for a lineup of a user according to an exemplary embodiment of the present invention.

FIG. 5 shows a method 500 for determining a win probability for a lineup of a user according to an exemplary embodiment of the present invention. The method 500 will be described with reference to the recommendation engine 300 and the recommendation provider 310 of FIG. 3. The method 500 relates to determining a win probability as a function of the opponent lineup.

In step 505, the recommendation provider 310 may receive the roster and a current lineup of the owner. In step 510, the recommendation provider 310 may receive the roster and a current lineup of the opponent. As discussed above, the current lineup may be selected by the respective owner or determined such as from using the method 400. In step 515, the recommendation provider 310 may receive player data and variability data as described above in step 415 of method 400.

In step 520, a determination is made whether the optimal opponent lineup is to be used for determining the win probability. Via the interface provided by the recommendation engine 300, the owner may select whether an optimal opponent lineup should be used. If the owner selects to use the optimal opponent lineup, the method 500 continues to step 525. In step 525, the recommendation provider 310 determines the optimal opponent lineup using, for example, the method 400 of FIG. 4. According to an exemplary embodiment of the present invention and for the purposes of this step, the optimal opponent lineup should be considered to be the opponent lineup with the best chances to defeat the owner lineup. If the owner selects to not use the optimal opponent lineup, the method 500 continues to step 530. In step 530, the current opponent lineup received in step 510 is used. In another exemplary embodiment of the present invention, the decision to use the optimal opponent lineup may be made by the system designer, and thus step 520 may continue directly to step 525 without user intervention; alternatively, a decision to use the current opponent lineup may be made by the system designer, and step 520 may proceed to step 530 directly.

After step 525 or step 530, the method 500 continues to step 535. In step 535, a determination is made whether the optimal owner lineup is to be used. Again via the interface provided by the recommendation engine 300, the owner/user may select whether an optimal owner lineup should be used. If the owner selects to use the optimal owner lineup, the method 500 continues to step 545. In step 545, the recommendation provider 310 determines the optimal owner lineup using, for example, the method 400 of FIG. 4. If the owner selects to not use the optimal owner lineup, the method 500 continues to step 540. In step 540, the current owner lineup received in step 505 is used.

Accordingly, from receiving the respective lineup of the owner and the opponent (either optimal lineup generated in step 525 or step 545 or the current lineup received in step 530 or step 540), the calculator 312 of the recommendation provider 310 is configured to determine the win probability in step 565.

After step 540 or step 545, the method 500 continues to step 550, where a determination is made whether the optimal opponent lineup is to be used for determining a win probability. This result is the same as in step 520, and, as discussed above, may or may not have required user interaction to determine. If the owner has selected to use the current opponent lineup, the method 500 continues to step 565. If the owner has selected to use the optimal opponent lineup, the method 500 continues to step 555. In step 555, the newly-computed optimal opponent lineup is compared to the previously-generated one. If the optimal opponent lineup has changed, the method 500 returns to step 535 for another iteration. Because the optimal lineups for both teams are interdependent, a change in one lineup may trigger a corresponding change in the other; for example, if the optimal opponent lineup includes a first wide receiver from a first professional football team, and the quarterback from the first professional football team is on the roster of the owner, the recommendation engine 300 may elect to start the quarterback, as the tight correlation between the projected statistical achievements of the quarterback and the first wide receiver may be beneficial to the win probability of the owner. Upon a second computation, the optimal opponent lineup may then select a second wide receiver from a second professional team, in an effort to counteract this correlation and to decouple the two lineups. This process may continue until the lineups no longer change, until the difference in win probability converges to a small number, or until a predetermined number of repetitions has occurred; this last limit prevents the method from entering a stalemate, wherein a set of players is cycled repeatedly in order to achieve a temporary advantage. If the optimal opponent lineup is maintained, the method 500 continues to step 565.

Figure 6:
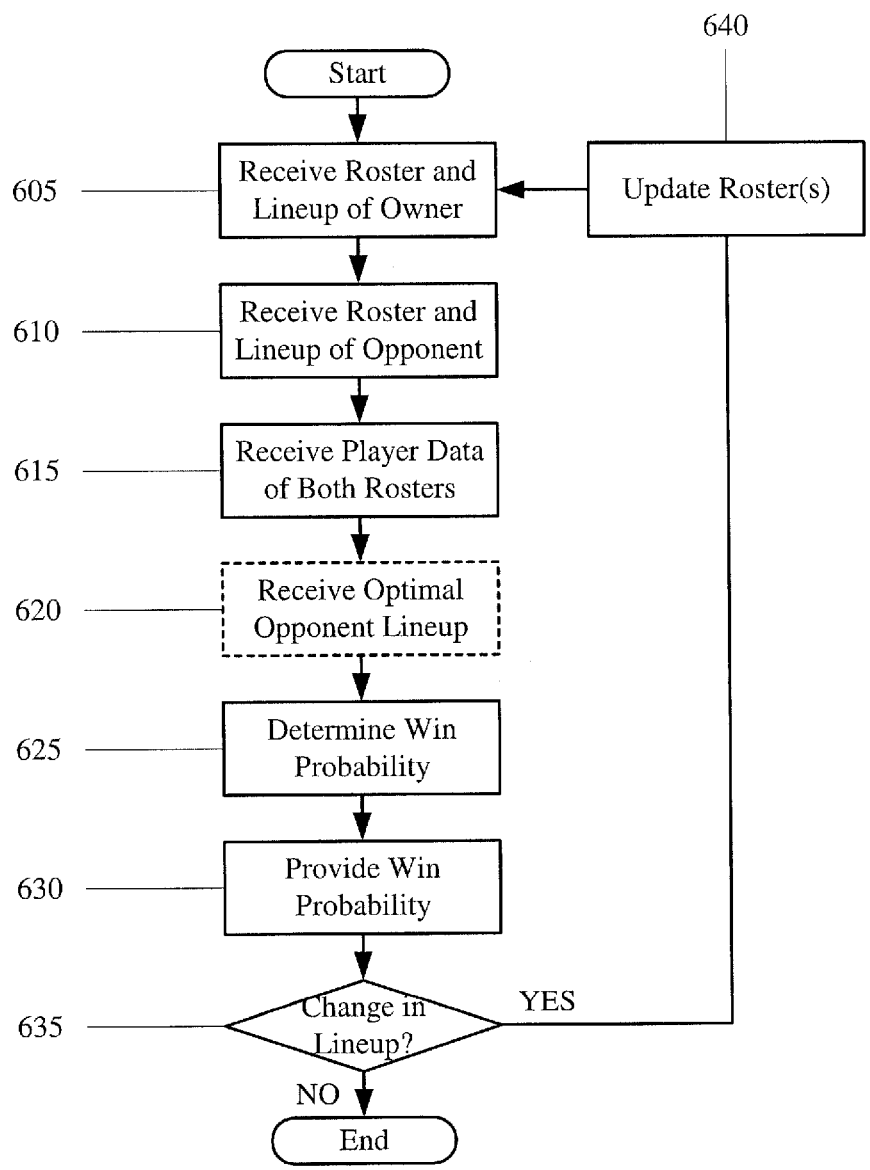
FIG. 6 shows a method for determining a win probability for a lineup of a user when changes are applied according to an exemplary embodiment of the present invention.

FIG. 6 shows a method 600 for determining a win probability for a lineup of a user when changes are applied according to an exemplary embodiment of the present invention. The method 600 will be described with reference to the recommendation engine 300 and the recommendation provider 310 of FIG. 3. The method 600 relates to further determinations of win probabilities should a change in the lineup be made manually by the owner or by the opponent.

In step 605, the recommendation provider 310 may receive the roster and a current lineup of the owner. In step 610, the recommendation provider 310 may receive the roster and a current lineup of the opponent. In step 615, the recommendation provider 310 may receive player data and variability data as described above in step 415 of method 400. In optional step 620, the optimal opponent lineup may be received, for example, by using the method 400 of FIG. 4. As discussed above, the optimal opponent lineup may be used (as determined by the method 400) or a current lineup which is received in step 610 (and thus always available) may be used in the subsequent steps.

In step 625, the calculator 312 of the recommendation provider 310 may determine the win probability as described above in the method 500 of FIG. 5. Subsequently in step 630, the win probability may be provided to the owner. In step 635, a determination is made whether either the owner's lineup or the opponent's lineup has been changed by an outside agency, such as an action of the owner. As discussed above, the fantasy sports application may include conventional features in which the user makes personal selections for the lineup. Thus, if either the owner or the opponent has changed the lineup manually, the method 600 continues to step 640, where the roster of the owner, the opponent, or both has been changed, or the respective lineups have been changed. Accordingly, the method 600 returns to step 605 to update the owner roster, opponent roster, and the respective lineups to determine the win probability in step 625.

Figure 7:
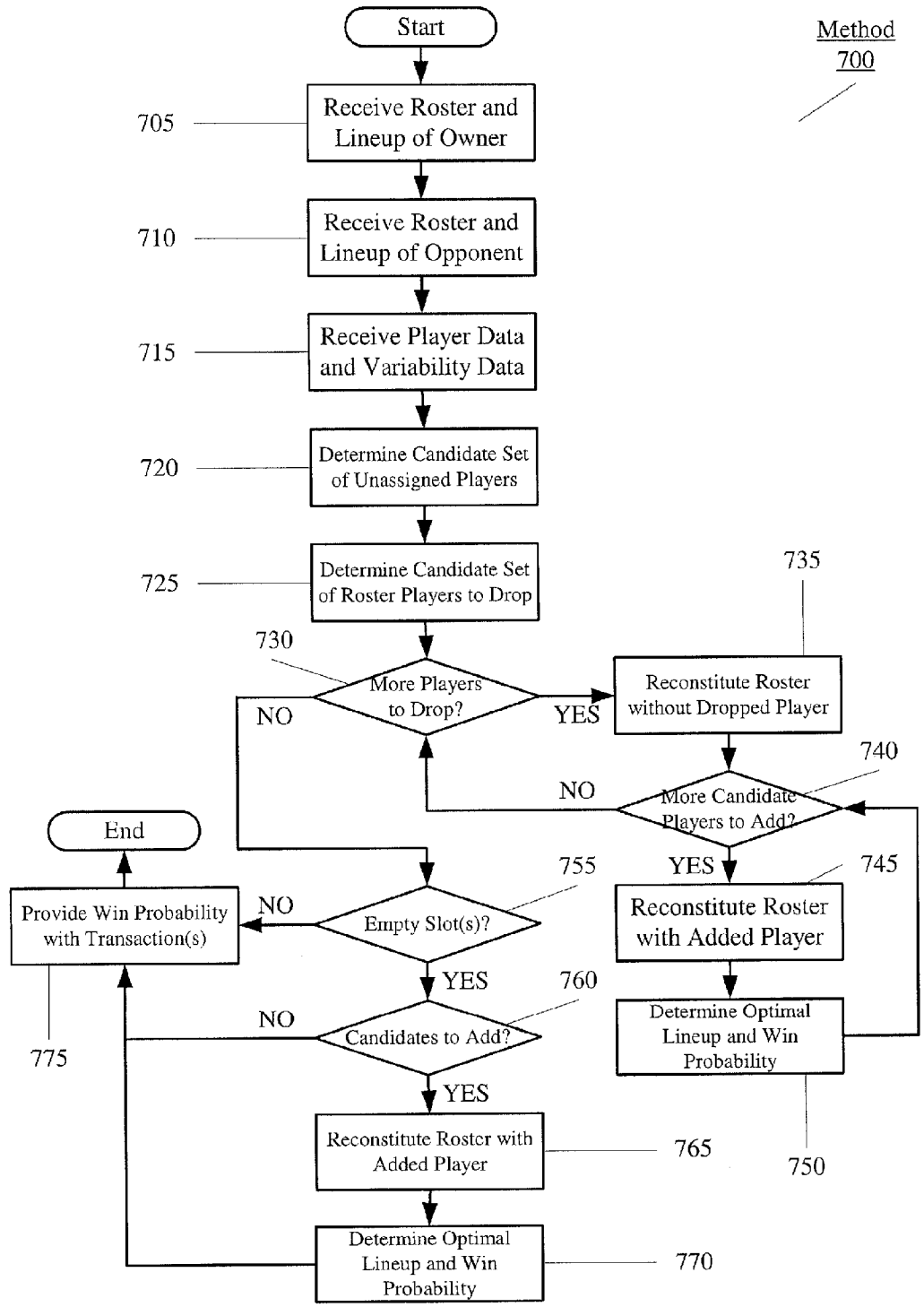
FIG. 7 shows a method for determining a win probability as a function of proposed transactions according to an exemplary embodiment of the present invention.

FIG. 7 shows a method 700 for determining a win probability as a function of proposed transactions according to an exemplary embodiment of the present invention. The method 700 will be described with reference to the recommendation engine 300 and the recommendation provider 310 of FIG. 3. The method 700 relates to determining a potential win probability by making a transaction (e.g., pickup, replacement, etc.) to obtain a currently unassigned player.

In step 705, the recommendation provider 310 may receive the roster and a current lineup of the owner. In step 710, the recommendation provider 310 may receive the roster and a current lineup of the opponent. As discussed above, the current lineup may be selected by the respective owner or determined such as from using the method 400. In step 715, the recommendation provider 310 may receive player data and variability data as described above in step 415 of method 400.

In step 720, the recommendation provider 310 may determine a candidate set of unassigned players who may potentially be added or used to replace a current player on the owner roster. The unassigned players may be any player who is currently available to be picked up by an owner. The candidate set of unassigned players may be a group of players who will potentially increase the win probability of the owner in a head-to-head match-up against the opponent should one of the players in the set be added to the lineup. The recommendation provider 310 need not include all potentially eligible players in the candidate set; the set may be limited to players expected to perform well. In step 725, the recommendation provider 310 determines a candidate set of roster players to drop. If the owner has a full complement of players in the roster, no further players may be added. Accordingly, if an unassigned player is to be included, a corresponding player currently on the roster must be replaced.

In step 730, a determination is made if more players remain in the candidate set of players to drop. For example, the roster of the owner may include players who may be unable to play, due to injury or other extenuating circumstances, or may have a bye week; alternatively, the roster may include players who are not projected to perform especially well in the matchup period under scrutiny. If there are more candidate players to be dropped from the owner roster, the method 700 selects one candidate and continues to step 735. In step 735, the recommendation provider 310 reconstitutes the roster without the dropped player. In step 740, a determination is made if more players remain in the candidate set of unassigned players to add. It is noted that this set should be considered with regard to each potential drop candidate, because the projected results of a transaction will depend heavily upon which particular player is being replaced. For example, adding a candidate tight end while dropping a quarterback is rarely a good move, as quarterbacks tend to score many more points in conventional fantasy football leagues. Therefore, this set will never be empty during the first pass with each potential candidate player to drop. If more players are to be considered for addition to the roster, the method 700 selects one such candidate and continues to step 745. In step 745, the recommendation provider 310 reconstitutes the roster with the added player. Subsequently, the new roster is used in step 750 to determine the optimal lineup of the target roster and the win probability, using, for example, the method 400 of FIG. 4 and the method 500 of FIG. 5. The method 700 returns to step 740 where a further determination is made whether or not further unassigned players exist in the candidate set. If no further unassigned players are to be added, the method 700 returns from step 740 to step 730.

Returning to step 730, if no (further) players are candidates to be dropped, the method 700 continues to step 755. In step 755, a determination is made whether there are empty slots in the roster. For example, the owner may have moved a player to an "injured reserve" list of players who are assigned to the team but ineligible for the lineup; these players then do not count against roster limits, resulting in an empty slot. Alternatively, the owner may have elected to release a player before choosing a replacement, or the owner may have been involved in an unbalanced trade. If there are empty slots on the roster, the method 700 continues to step 760. In step 760, a determination is made whether there are candidate unassigned players to add to occupy an empty slot on the roster. If there are players to add, the method 700 selects a candidate and continues to step 765, where the roster is reconstituted with the added player, as in step 745. Accordingly in step 770, in a substantially similar manner as described in step 750, the optimal lineup and win probability are determined.

Thus, after all potential transactions to optimize the lineup to generate the highest win probability are considered, the method 700 continues to step 775, where the win probability is provided to the owner, along with all necessary transactions involved in generating the win probability with the optimal owner lineup.

In an alternate embodiment of the present invention, some of the necessary adjustments may be omitted from the display in step 775, allowing the user to construct a lineup manually or with a tool, such as, for example, method 600. That is, the display in step 775 may show the calculated probability but omits any display of the specific adjustments necessary to achieve that probability. For example, a recommendation may indicate that "adding player A will give you a 75% chance to win" without specifying that a second player must also be moved from thee bench to reach to an active lineup in order to make the 75% figure accurate.

In another alternate embodiment of the present invention, the user may be presented with an option to apply the necessary changes to increase the win probability without being presented with the details of the steps involved.

It should be noted that the above-described methods may include further steps not shown. For example, the recommendation provider 310 may determine a probability value that indicates the chance that a tie is likely to occur between the owner lineup and the opponent lineup. The method may include a calculation by the calculator 312 of a probability value for a tiebreaker. Depending on the rules of the league, the tiebreaker may be calculated as a function of the "benched" players currently not on the lineups of the owner and opponent. The recommendation provider 310 may use player data and variability data related to the benched players to provide a "tiebreaker" probability value.

The exemplary embodiments of the present invention provide a recommendation engine that receives player data from a plurality of different sources such that the probability of the lineup of the owner to defeat the lineup of the opponent owner is provided. The recommendation engine may generate a recommendation as to the lineup that would produce the highest probability value versus a current opponent. In addition, the recommendation engine may be configured to determine potential substitutions from available players that would further increase the odds that the owner will beat the opponent lineup.

Thus, through consideration of the match up in a holistic manner, the recommendation engine is able to provide a better recommendation to the owner, increasing the probability of victory. In contrast to conventional recommendation engines that simply attempt to achieve a maximum score, the recommendation engine according to the exemplary embodiments of the present invention allows risk to be considered. For example, if an opponent has a large number of players with a high degree of variance, it is possible, even likely, that a lineup of safe (non-risky) players is more likely to produce victory over the opponent lineup than a lineup of risky players, even if the risky players are projected to score slightly more points.

Those skilled in the art will understand that the above-described exemplary embodiments may be implemented in any number of manners, including, as a separate software module, as a combination of hardware and software, etc. For example, the recommendation engine may be a program containing lines of code that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method for a fantasy sports application, comprising:
  (a) receiving, by a processor, a first roster including at least one first sport player for a first user and an opponent roster including at least one opponent sport player for an opponent user;
  (b) receiving, by the processor, at least one parameter value for each of the sport players on the first and opponent rosters;
  (c) determining, by the processor, a score value for each of the sport players on the first and opponent rosters as a function of the at least one parameter value;
  (d) determining, by the processor, at least one first recommend lineup for the first user as a subset of the first roster and at least one opponent lineup for the opponent user as a subset of the opponent roster, the first recommended lineup having a first projected probability distribution and the opponent lineup having an opponent projected probability distribution, the first and opponent projected probability distributions determined as a function of the score values; and
  (e) determining, by the processor, a win probability value for the first user as a function of the first and opponent projected probability distributions, the win probability value being indicative of a prediction of a comparison between a first actual total score value and an opponent actual total score value, the first and opponent actual total score values being determined for the first recommended lineup and the opponent lineup, respectively, after a match-up between the first and opponent users.

2. The method of claim 1, wherein, in step (d), the at least one first recommended lineup includes a plurality of first lineups, a plurality of respective first projected probability distributions being determined for each of the first lineups and the at least one opponent lineup includes a plurality of opponent lineups, a plurality of respective opponent projected probability distributions being determined for each of the opponent lineups.

3. The method of claim 1, further comprising:
providing, by the processor, a list of each of the sport players included in the first recommended lineup and the opponent lineup.

4. The method of claim 1, further comprising:
receiving, by the processor, a substitution for at least one of the sport players in the first recommended lineup;
determining, by the processor, the score value for the substitution; and
determining, by the processor, an adjusted first projected probability distribution.

5. The method of claim 4, further comprising:
determining, by the processor, an adjusted win probability value as a function of the adjusted first projected probability distribution and the opponent projected probability distribution.

6. The method of claim 4, wherein the substitution is selected from a remaining sport player of the first roster, the remaining sport player not being selected for the first recommended lineup.

7. The method of claim 4, wherein the substitution is a sport player not on the first and opponent rosters.

8. The method of claim 1, further comprising:
when the win probability value is indicative of a tie, determining, by the processor, a further win probability value as a function of the first and opponent rosters.

9. The method of claim 8, wherein the further win probability value is indicative of the first user having a first further actual total score value greater than the opponent user having an opponent further actual total score value, the first and opponent further actual total score values related to the first and opponent sport players not in the first recommended lineup and the opponent lineup, respectively.

10. The method of claim 1, wherein the opponent projected probability distribution is from an opponent lineup manually determined by the opponent user.

11. The device of claim 1, wherein, when the win probability value is indicative of a tie, the processor receives a further win probability value as a function of the first and opponent rosters.

12. The device of claim 11, wherein the further win probability value is indicative of the first user having a first further actual total score value greater than the opponent user having an opponent further actual total score value, the first and opponent further actual total score values related to the first and opponent sport players not in the first recommended lineup and the opponent lineup, respectively.

13. A device, comprising:
a communication arrangement configured to communicate via a communication network;
a display arrangement;
a memory arrangement; and
a processor for a fantasy sports application,
wherein the processor receives a first roster including at least one first sport player for a first user and an opponent roster including at least one opponent sport player for an opponent user;
wherein the processor receives at least one parameter value for each of the sport players on the first and opponent rosters;
wherein the processor receives a score value for each of the sport players on the first and opponent rosters as a function of the at least one parameter value;
wherein the processor determines at least one first recommended lineup for the first user as a subset of the first roster and at least one opponent lineup for the opponent user as a subset of the opponent roster, the first recommended lineup having a first projected probability distribution and the opponent lineup having an opponent projected probability distribution, the first and opponent projected probability distributions determined as a function of the score values; and
wherein the processor determines a win probability value for the first user as a function of the first and opponent projected probability distributions, the win probability value being indicative of a prediction of a comparison between a first actual total score value and an opponent actual total score value, the first and opponent actual total score values being determined for the first recommended lineup and the opponent lineup, respectively, after a match-up between the first and opponent users.

14. The device of claim 13, wherein the at least one first recommended lineup includes a plurality of first lineups, the processor receiving a plurality of respective first projected probability distributions being determined for each of the first lineups and the at least one opponent lineup includes a plurality of opponent lineups, the processor receiving a plurality of respective opponent projected probability distributions being determined for each of the opponent lineups.

15. The device of claim 13, wherein the display arrangement shows a list of each of the sport players included in the first recommended lineup and the opponent lineup.

16. The device of claim 13, wherein the processor receives a substitution for at least one of the sport players in the first recommended lineup, determines the score value for the substitution, and determines an adjusted first projected probability distribution.

17. The device of claim 16, wherein the processor determines an adjusted win probability value as a function of the adjusted first projected probability distribution and the opponent projected probability distribution.

18. The device of claim 16, wherein the substitution is selected from a remaining sport player of the first roster, the remaining sport player not being selected for the first recommended lineup.

19. The device of claim 16, wherein the substitution is a sport player not on the first and opponent rosters.

20. A non-transitory computer readable storage medium with an executable program stored thereon, wherein the program instructs a processor to perform operations comprising:
receive a first roster including at least one first sport player for a first user and an opponent roster including at least one opponent sport player for an opponent user;
receive at least one parameter value for each of the sport players on the first and opponent rosters;
determine a score value for each of the sport players on the first and opponent rosters as a function of the at least one parameter value;
determine at least one first recommended lineup for the first user as a subset of the first roster and at least one opponent lineup for the opponent user as a subset of the opponent roster, the first recommended lineup having a first projected probability distribution and the opponent lineup having an opponent projected probability distribution, the first and opponent projected probability distributions determined as a function of the score values; and determine a win probability value for the first user as a function of the first and opponent projected probability distributions, the win probability value being indicative of a prediction of a comparison between a first actual total score value and an opponent actual total score value, the first and opponent actual total score values being determined for the first recommended lineup and the opponent lineup, respectively, after a match-up between the first and opponent users.

* * * * *